(No Model.)
W. R. THATCHER.
COMBINED ICE CREAM FREEZER AND CHURN.
No. 546,945.          Patented Sept. 24, 1895.
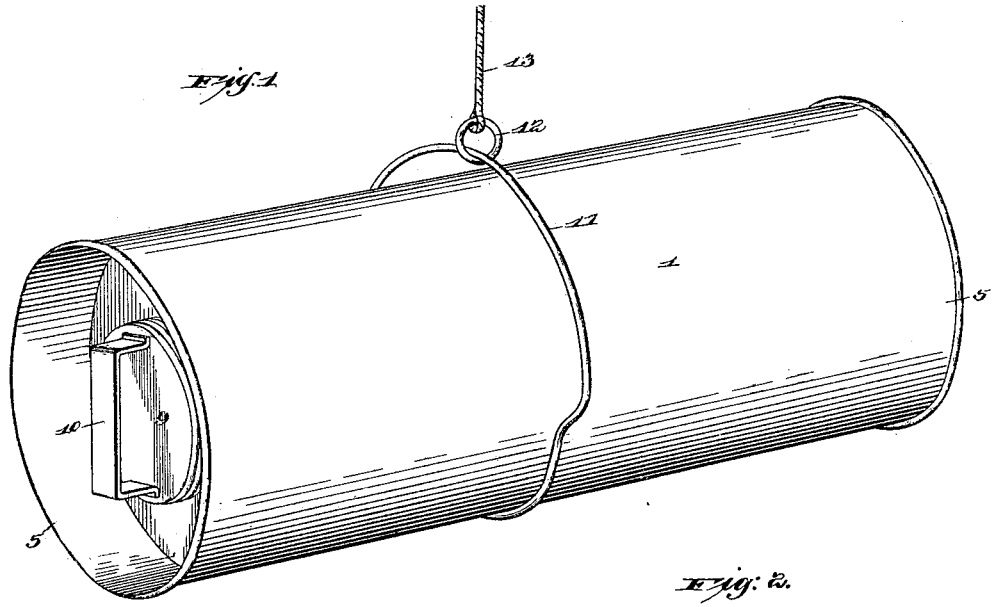
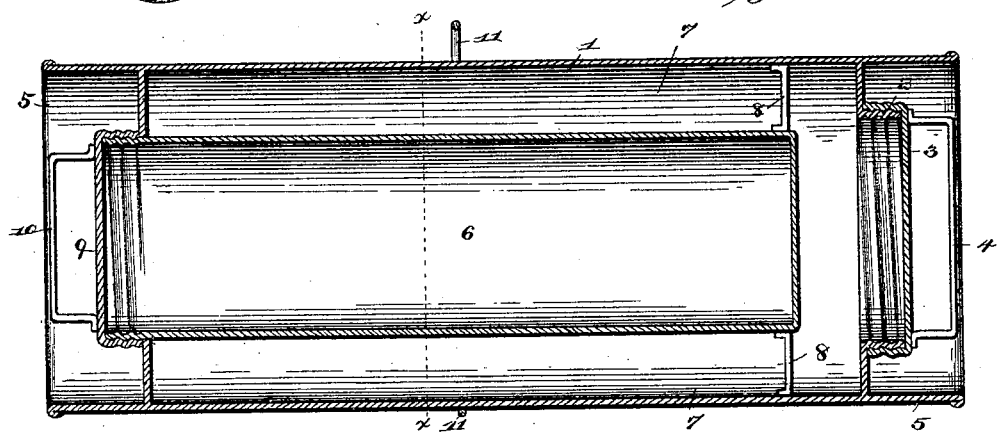
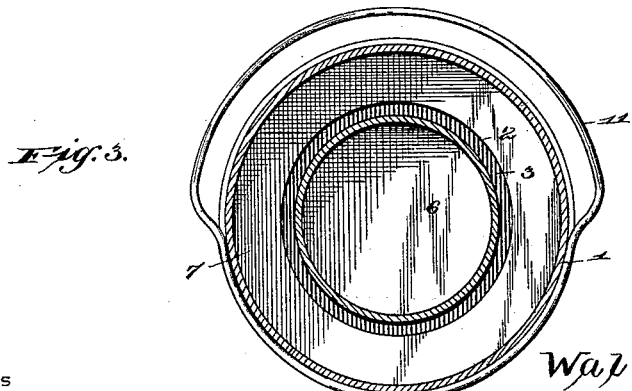
Inventor
Walter R. Thatcher.
By his Attorneys.
C. A. Snow & Co.
Witnesses

UNITED STATES PATENT OFFICE.

WALTER R. THATCHER, OF OSKALOOSA, IOWA.

COMBINED ICE-CREAM FREEZER AND CHURN.

SPECIFICATION forming part of Letters Patent No. 546,945, dated September 24, 1895.

Application filed December 18, 1894. Serial No. 532,221. (No model.)

*To all whom it may concern:*

Be it known that I, WALTER R. THATCHER, a citizen of the United States, residing at Oskaloosa, in the county of Mahaska and State of Iowa, have invented a new and useful Combined Ice-Cream Freezer and Churn, of which the following is a specification.

This invention relates to combined ice-cream freezers and churns; and it has for its object to provide a new and useful machine of this character that can be either used for freezing ice-cream or as a churn for making butter.

To this end the main and primary object of the present invention is to provide a simple and efficient combined machine of the character noted that will insure either a quick freezing of cream or a churning thereof to produce butter.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a combined ice-cream freezer and churn constructed in accordance with this invention. Fig. 2 is a central longitudinal sectional view thereof. Fig. 3 is a transverse sectional view on the line $x$ $x$ of Fig. 1.

Referring to the accompanying drawings, 1 designates an outer cylindrical can, preferably made of sheet metal and in any desired size, according to the required capacity of the machine for making ice-cream or butter, and said outer cylindrical can 1 is closed at one end and is provided at its opposite end with a cap-opening 2, over which is removably fitted a screw-cap 3, which cap is provided on the outside thereof with a handle 4, that not only provides means for screwing and unscrewing the cap, but also for swinging or operating the machine to secure the desired agitation of the contents thereof. The said outer cylindrical can is provided at both ends with the flange-extensions 5, that form rests at both ends of the machine, so that the same can be readily placed on the floor in an upright position in filling and unfilling the machine. The said outer can is adapted to receive therein a fixedly positioned smaller inner can 6 that contains the cream which is to be either frozen or churned into butter.

The inner can 6 is sufficiently smaller in diameter or width than the outer can 1 to form between the inner and outer cans an ice or water space 7, that is adapted to contain the mixture of ice and salt when the machine is used as a freezer, or is adapted to contain warm or cold water in churning in order to maintain the cream at the desired temperature. The said smaller inner can 6 may be securely braced from the inner sides of the can 1 by means of suitable spacing-braces 8, and said inner can 6 is fitted at its open end in the bottom or closed end of the outer can 1. The open end of the can 6 is adapted to be inclosed by a screw or other suitable cap 9, that is arranged on the outside of the closed end of the can 1 and is arranged entirely inside of one of the end flange-extensions of said outer can. The cap 9 is also provided with a handle 10 for manipulating the same and also for operating the machine.

At a central point the outer can 1 has secured thereto an offset concentrically-arranged attaching-bail 11, on which is loosely arranged a running-ring 12, that is adapted to be attached to a suspending-cord or other suitable swinging hanger 13, that provides for freely suspending the machine so that it may be twisted or rotated in opposite directions and swung or tilted in any direction to insure the proper agitation of the contents of the machine.

When the machine is used as an ice-cream freezer, it will be noted that the reverse disposition of the open ends of the outer and inner cans will render it impossible for salt or salt-water to contaminate the cream, and it will be further understood that when used as a freezer the cream is placed in the can 6 and the mixture of salt and ice in the space 7 within the can 1, and when used as a churn the space 7 will accommodate water, either hot or cold, to provide for maintaining the cream that is being churned at the proper temperature, and whether used as a freezer or a churn the specific construction and manner of mounting the machine will provide for a quick operation in freezing or churning.

Changes in the form, proportion, and the minor details of construction may be resorted to without departing from the principle or sacrificing any of the advantages of this invention.

Having thus described the invention, what is claimed, and desired to be secured by Letters Patent, is—

A combined ice cream freezer and churn consisting of an outer cylindrical can provided with a cap opening at one end and with flange extensions at both ends forming rests to support the can on either end in an upright position, a cap removably fitted over the cap opening of the outer can and provided with a handle disposed entirely within one of said flange extensions, a fixedly positioned smaller inner cylindrical can fitted inside of the outer can and provided with an open end projected beyond the closed end of the outer can, a cap removably fitted over the open end of the small inner can and provided with a handle disposed entirely within one of the flange extensions, an offset concentrically arranged bail rigidly attached to the outer can, and a running ring loosely engaging said bail and adapted to be connected to a swinging hanger, whereby the combined freezer and churn can be given a free lateral rotation in opposite directions and also a swinging movement in any direction by grasping the handles at either end, substantially as set forth.

In testimony that I claim the foregoing as my own I have hereto affixed my signature in the presence of two witnesses.

WALTER R. THATCHER.

Witnesses:
J. W. JOHNSON,
SAM W. JONES.